US012594625B1

(12) United States Patent
Keleshian et al.

(10) Patent No.: US 12,594,625 B1
(45) Date of Patent: *Apr. 7, 2026

(54) LASER MATERIAL FUSION UNDER VACUUM, AND ASSOCIATED SYSTEMS AND METHODS

(71) Applicant: Blue Origin Manufacturing, LLC, Huntsville, AL (US)

(72) Inventors: Nicholas James Keleshian, Kent, WA (US); Christina Michelle Valenzuela, Kent, WA (US); Chad Michael Ellison, Kent, WA (US); Christopher Ryan Long, Kent, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,898

(22) Filed: Oct. 16, 2023

Related U.S. Application Data

(63) Continuation of application No. 16/830,141, filed on Mar. 25, 2020, now Pat. No. 11,819,943.

(60) Provisional application No. 62/825,572, filed on Mar. 28, 2019.

(51) Int. Cl.
| | |
|---|---|
| *B23K 26/00* | (2014.01) |
| *B23K 26/03* | (2006.01) |
| *B23K 26/12* | (2014.01) |
| *B23K 26/24* | (2014.01) |
| *B23K 31/12* | (2006.01) |
| *B23K 26/342* | (2014.01) |

(Continued)

(52) U.S. Cl.
CPC ............ *B23K 26/24* (2013.01); *B23K 26/032* (2013.01); *B23K 26/1224* (2015.10); *B23K*

*31/125* (2013.01); *B23K 26/342* (2015.10); *B33Y 10/00* (2014.12); *B33Y 30/00* (2014.12)

(58) Field of Classification Search
CPC .. B23K 26/24; B23K 26/1224; B23K 26/032; B23K 31/125; B23K 26/342; B33Y 10/00; B33Y 30/00
USPC ...................................................... 219/121.64
See application file for complete search history.

(56) References Cited

U.S. PATENT DOCUMENTS

| | | | | | |
|---|---|---|---|---|---|
| 3,169,183 | A | * | 2/1965 | Radtke ................. | B23K 26/032 |
| | | | | | 219/121.76 |
| 3,560,258 | A | * | 2/1971 | Brisbane ............... | H01L 23/522 |
| | | | | | 219/121.75 |

(Continued)

FOREIGN PATENT DOCUMENTS

| | | | | | |
|---|---|---|---|---|---|
| CN | 111266579 | A | * | 6/2020 | .............. B22F 10/32 |
| DE | 102014210838 | A1 | * | 12/2015 | ......... B23K 26/0648 |

OTHER PUBLICATIONS

U.S. Appl. No. 16/120,050, filed Aug. 31, 2018, Luick.

(Continued)

*Primary Examiner* — Jimmy Chou
(74) *Attorney, Agent, or Firm* — Hogan Lovells US LLP

(57) ABSTRACT

Systems and methods for laser beam welding in a vacuum and for controlling laser beam welding processes, such as for use in manufacturing aerospace parts, are described herein. In some embodiments, a laser beam welding system can include an optical head movably positioned within a vacuum chamber. The optical head can be configured to direct a laser beam toward a part positioned within the vacuum chamber to melt and fuse the part.

18 Claims, 6 Drawing Sheets

(51) Int. Cl.
  *B33Y 10/00* (2015.01)
  *B33Y 30/00* (2015.01)

(56) References Cited

U.S. PATENT DOCUMENTS

| | | | | | |
|---|---|---|---|---|---|
| 3,702,389 | A | * | 11/1972 | Peyrot | B23K 15/06 |
| | | | | | 219/121.13 |
| 3,949,186 | A | * | 4/1976 | Nakayama | B23K 15/04 |
| | | | | | 219/121.36 |
| 4,504,726 | A | * | 3/1985 | Hosaka | B23K 26/1224 |
| | | | | | 219/121.68 |
| 4,532,401 | A | * | 7/1985 | Shiozaki | B23K 26/1224 |
| | | | | | 219/121.84 |
| 4,584,479 | A | * | 4/1986 | Lamattina | F16J 15/168 |
| | | | | | 219/121.22 |
| 4,609,566 | A | * | 9/1986 | Hongo | G03F 1/72 |
| | | | | | 118/725 |
| 4,818,562 | A | * | 4/1989 | Arcella | C23C 26/02 |
| | | | | | 118/DIG. 5 |
| 4,851,061 | A | * | 7/1989 | Sorkoram | B23K 26/702 |
| | | | | | 219/121.72 |
| 4,857,698 | A | * | 8/1989 | Perun | B64C 23/00 |
| | | | | | 219/121.84 |
| 4,964,940 | A | * | 10/1990 | Auvert | B23K 26/127 |
| | | | | | 427/596 |
| 5,159,169 | A | * | 10/1992 | Nishikawa | B23K 26/0643 |
| | | | | | 219/121.75 |
| 5,227,608 | A | * | 7/1993 | Yoshida | B23K 26/16 |
| | | | | | 219/121.84 |
| 5,407,119 | A | * | 4/1995 | Churchill | C04B 37/006 |
| | | | | | 228/232 |
| 5,837,960 | A | * | 11/1998 | Lewis | B23K 26/144 |
| | | | | | 219/121.64 |
| 5,874,011 | A | * | 2/1999 | Ehrlich | H01L 21/76894 |
| | | | | | 216/75 |
| 5,906,760 | A | * | 5/1999 | Robb | B23K 26/142 |
| | | | | | 219/121.84 |
| 5,930,606 | A | * | 7/1999 | McCulloch | B23K 26/0665 |
| | | | | | 438/157 |
| 5,977,515 | A | * | 11/1999 | Uraki | B23K 26/1423 |
| | | | | | 219/121.84 |
| 6,429,402 | B1 | | 8/2002 | Dixon | |
| 6,657,154 | B1 | * | 12/2003 | Tanabe | H01L 29/42384 |
| | | | | | 219/121.75 |
| 7,073,561 | B1 | * | 7/2006 | Henn | B22F 10/40 |
| | | | | | 164/94 |
| 7,168,935 | B1 | * | 1/2007 | Taminger | B23K 15/0073 |
| | | | | | 264/408 |
| 7,902,483 | B2 | * | 3/2011 | Eiterer | B23K 26/0604 |
| | | | | | 219/121.76 |
| 8,172,562 | B2 | | 5/2012 | Mattes | |
| 8,452,073 | B2 | * | 5/2013 | Taminger | H01J 37/304 |
| | | | | | 218/136 |
| 8,546,717 | B2 | * | 10/2013 | Stecker | B22F 12/38 |
| | | | | | 219/121.13 |
| 8,847,104 | B2 | * | 9/2014 | Wang | B23K 26/40 |
| | | | | | 219/121.72 |
| 9,138,807 | B1 | | 9/2015 | Takezawa et al. | |
| 9,221,100 | B2 | | 12/2015 | Schwarze et al. | |
| 9,254,535 | B2 | | 2/2016 | Buller et al. | |
| 9,346,127 | B2 | | 5/2016 | Buller et al. | |
| 9,358,638 | B2 | * | 6/2016 | Hori | B23K 26/24 |
| 9,399,256 | B2 | | 7/2016 | Buller et al. | |
| 9,403,235 | B2 | | 8/2016 | Buller et al. | |
| 9,486,878 | B2 | | 11/2016 | Buller et al. | |
| 9,573,193 | B2 | | 2/2017 | Buller et al. | |
| 9,573,225 | B2 | | 2/2017 | Buller et al. | |
| 9,586,290 | B2 | | 3/2017 | Buller et al. | |
| 9,784,111 | B2 | | 10/2017 | Luo et al. | |
| 9,821,411 | B2 | | 11/2017 | Buller et al. | |
| 9,844,915 | B2 | | 12/2017 | Maeda et al. | |
| 9,919,360 | B2 | | 3/2018 | Buller et al. | |
| 9,925,715 | B2 | | 3/2018 | Cheverton et al. | |
| 9,931,697 | B2 | | 4/2018 | Levin et al. | |
| 9,956,612 | B1 | | 5/2018 | Redding et al. | |
| 9,962,767 | B2 | | 5/2018 | Buller et al. | |
| 9,993,873 | B2 | | 6/2018 | Kovalcik et al. | |
| 2002/0108934 | A1 | * | 8/2002 | Garcia | B23K 26/14 |
| | | | | | 219/121.72 |
| 2002/0153360 | A1 | * | 10/2002 | Yamazaki | H01L 21/02683 |
| | | | | | 257/E21.32 |
| 2002/0182877 | A1 | * | 12/2002 | Nantel | B23K 26/127 |
| | | | | | 216/62 |
| 2003/0032214 | A1 | * | 2/2003 | Huang | B29C 64/112 |
| | | | | | 264/435 |
| 2003/0106881 | A1 | * | 6/2003 | Lee | H01J 37/32082 |
| | | | | | 219/121.68 |
| 2004/0226927 | A1 | * | 11/2004 | Morikazu | B23K 26/142 |
| | | | | | 219/121.84 |
| 2008/0067160 | A1 | * | 3/2008 | Suutarinen | B23K 26/1224 |
| | | | | | 219/121.67 |
| 2008/0241425 | A1 | * | 10/2008 | Li | B23K 26/066 |
| | | | | | 427/596 |
| 2008/0268571 | A1 | * | 10/2008 | Kim | B23K 26/0626 |
| | | | | | 219/121.75 |
| 2009/0007933 | A1 | * | 1/2009 | Thomas | B23K 26/36 |
| | | | | | 219/121.81 |
| 2010/0108648 | A1 | * | 5/2010 | Koseki | B23K 26/12 |
| | | | | | 219/121.84 |
| 2011/0008530 | A1 | * | 1/2011 | Woods | C22F 1/183 |
| | | | | | 427/540 |
| 2012/0094839 | A1 | * | 4/2012 | Khare | B23K 26/147 |
| | | | | | 505/480 |
| 2013/0341313 | A1 | * | 12/2013 | Himmelsbach | B23K 26/70 |
| | | | | | 219/121.86 |
| 2014/0001162 | A1 | * | 1/2014 | Tanaka | H01L 24/75 |
| | | | | | 219/121.6 |
| 2014/0001163 | A1 | * | 1/2014 | Tanaka | H01L 24/75 |
| | | | | | 219/121.63 |
| 2014/0124483 | A1 | * | 5/2014 | Henn | B23K 26/342 |
| | | | | | 219/76.1 |
| 2014/0263209 | A1 | * | 9/2014 | Burris | B22F 12/43 |
| | | | | | 219/121.75 |
| 2014/0263246 | A1 | * | 9/2014 | Brice | B23K 15/06 |
| | | | | | 427/595 |
| 2014/0271328 | A1 | * | 9/2014 | Burris | B23K 26/034 |
| | | | | | 419/53 |
| 2015/0037601 | A1 | * | 2/2015 | Blackmore | B23K 15/002 |
| | | | | | 219/76.1 |
| 2015/0136226 | A1 | * | 5/2015 | Guo | B23K 26/355 |
| | | | | | 428/141 |
| 2015/0258633 | A1 | * | 9/2015 | Hori | B23K 15/006 |
| | | | | | 228/47.1 |
| 2015/0328719 | A1 | * | 11/2015 | Jarvis | B23K 1/0053 |
| | | | | | 219/76.12 |
| 2016/0059310 | A1 | * | 3/2016 | Junker | B01D 50/10 |
| | | | | | 419/53 |
| 2016/0059363 | A1 | * | 3/2016 | Ardisson | B23K 26/032 |
| | | | | | 219/121.67 |
| 2016/0107232 | A1 | * | 4/2016 | Okazaki | B29C 64/153 |
| | | | | | 425/78 |
| 2016/0114427 | A1 | | 4/2016 | Eibl et al. | |
| 2016/0207147 | A1 | | 7/2016 | Van Hassel | |
| 2017/0021455 | A1 | * | 1/2017 | Dallarosa | B22F 12/41 |
| 2017/0050261 | A1 | * | 2/2017 | Li | B22F 10/28 |
| 2017/0136538 | A1 | * | 5/2017 | Yoshimura | B29C 64/188 |
| 2017/0146382 | A1 | * | 5/2017 | Gold | B22F 12/90 |
| 2017/0151727 | A1 | | 6/2017 | Ederer et al. | |
| 2017/0173883 | A1 | | 6/2017 | Gray | |
| 2017/0190112 | A1 | | 7/2017 | Thorson et al. | |
| 2017/0209961 | A1 | * | 7/2017 | Cavanaugh | B23K 26/0823 |
| 2017/0304947 | A1 | * | 10/2017 | Shibazaki | B22F 10/25 |
| 2017/0334099 | A1 | | 11/2017 | Araie et al. | |
| 2018/0200964 | A1 | | 7/2018 | Rockstroh | |
| 2018/0236549 | A1 | | 8/2018 | Spears et al. | |
| 2019/0030650 | A1 | * | 1/2019 | Clark | B23K 26/127 |
| 2020/0188307 | A1 | * | 6/2020 | Freiderikos | B29C 64/165 |
| 2020/0266105 | A1 | * | 8/2020 | Ikenoue | B23K 26/0732 |
| 2021/0078104 | A1 | * | 3/2021 | Määttänen | B23K 26/1224 |

(56)     References Cited

U.S. PATENT DOCUMENTS

| | | | |
|---|---|---|---|
| 2021/0287921 A1* | 9/2021 | Tanaka .............. | H01L 21/67248 |
| 2022/0152751 A1* | 5/2022 | Kawai .................. | B23K 26/123 |
| 2022/0176453 A1* | 6/2022 | Matsuda ................ | B33Y 50/02 |

OTHER PUBLICATIONS

U.S. Appl. No. 16/830,141, filed Mar. 25, 2020, Keleshian et al.
Benda, J.A., "Temperature-Controlled Selective Laser Sintering,"
United Technologies, Research Center, East Hartford, CT., 1994, 8
pages.
Renisi—"Unlock your additive manufacturing possibilities with
multi-laser productivity," https://www.renishaw.com/en/unlock-your-
additive-manufacturing-possibilities-with-multi-laser-productivity--
43419, Jun. 1, 2018, 4 pages.

* cited by examiner

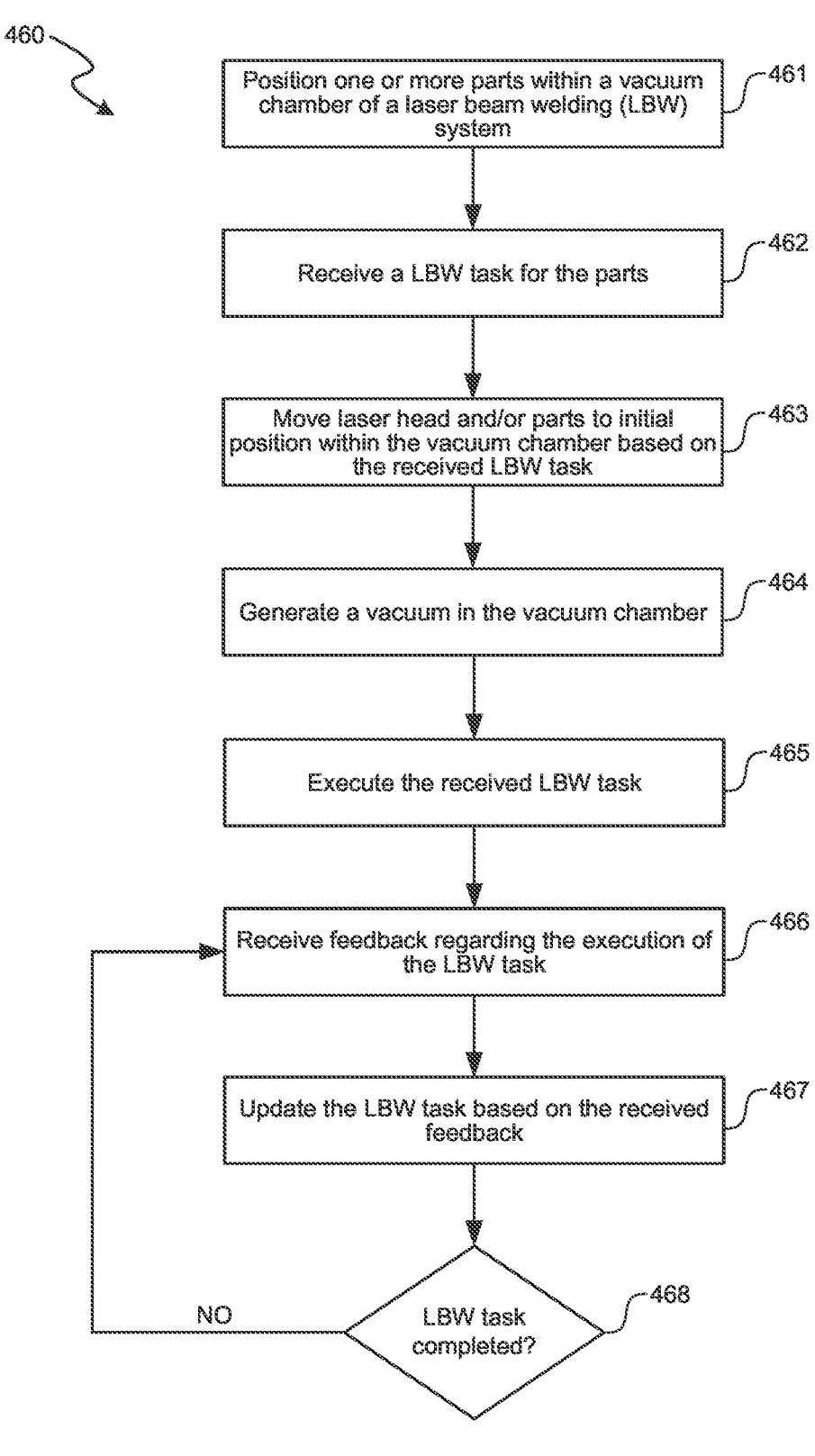

460

461 Position one or more parts within a vacuum chamber of a laser beam welding (LBW) system 462 Receive a LBW task for the parts 463 Move laser head and/or parts to initial position within the vacuum chamber based on the received LBW task 464 Generate a vacuum in the vacuum chamber 465 Execute the received LBW task 466 Receive feedback regarding the execution of the LBW task 467 Update the LBW task based on the received feedback 468 LBW task completed?

Receive a laser beam welding (LBW) task for one or more parts — 681

Move a LBW system to an initial position — 682

Generate a vacuum in a vacuum chamber of the LBW system — 683

Execute the received LBW task — 684

Receive feedback regarding the execution of the LBW task — 685

Update the LBW task based on the received feedback — 686

LBW task completed? — 687

NO

LASER MATERIAL FUSION UNDER VACUUM, AND ASSOCIATED SYSTEMS AND METHODS

CROSS REFERENCE TO RELATED APPLICATION

This application claims priority to U.S. Provisional Patent Application No. 62/825,572, titled "LASER MATERIAL FUSION UNDER VACUUM, AND ASSOCIATED SYSTEMS AND METHODS," and filed Mar. 28, 2019, which is incorporated herein by reference in its entirety.

TECHNICAL FIELD

The present technology relates generally to systems and methods for controlling laser beam welding processes or laser-based additive manufacturing processing, such as for use in manufacturing aerospace parts.

BACKGROUND

Many manufacturing processes require welding two or more parts together. For example, aerospace manufacturers must frequently weld multiple metal workpieces together to form/repair aerospace parts. Due to the high stresses and low structural margins on aerospace parts during use, it is important that the welds joining aerospace parts are of high strength and quality. In particular, the welds must be deep enough to provide the required strength at the connection point between the parts with minimal additional material added for unknowns in the joining process.

Often, electron-beam welding (EBW) is used to weld together aerospace parts. EBW is a fusion welding process in which a beam of high-velocity electrons is applied to the parts to be joined until the parts melt and flow together as the kinetic energy of the electrons is transformed into heat upon impact. However, EBW must be performed under high vacuum conditions to prevent dissipation (e.g., scattering) of the electron beam. Moreover, impingement of the electron beam on a metallic substrate generates significant X-radiation. This X-radiation can be harmful or deadly to humans and thus requires heavy radiation shielding commensurate with the accelerating voltage used, such as fully welded steel construction or welded lead. As the accelerating voltage of the electron beam is increased (e.g., to produce a deeper weld), shielding requirements for the X-radiation increase.

Some manufacturing processes utilize laser beam welding (LBW) to join parts together. LBW utilizes a laser beam which provides a concentrated heat source that melts and fuses the parts together. Because many laser beam wavelengths are not significantly scattered/dissipated by atmospheric gases to a high degree, LBW is typically carried out at atmospheric pressure. However, it can be difficult to achieve deep welds using LBW. Notably, the required laser power increases exponentially with weld depth as secondary scattering effects occur due to evolution of metal vapors and process effluents. When the power density of the laser beam is sufficiently high, the laser beam can partially vaporize the metal parts and form a metal vapor column (commonly referred to as a "keyhole"), enabling high-depth to width ratio welds.

More particularly, FIG. 1 is a side cross-sectional view of a metal workpiece 100 during an LBW process using a laser beam 102. As shown, the energy from the laser beam 102 heats the workpiece and causes a keyhole 104 to form in the workpiece. The keyhole 104 is essentially a column of metal vapor supported by pressure generated by the interaction of the laser beam 102 (which has a sufficiently high power) with the metal workpiece 100. A molten metal pool 106 can surround the keyhole 104 and, as the workpiece 104 is moved in a direction A, the molten metal solidifies to form a weld seam 108. However, sometimes (e.g., when attempting to produce welds with a depth of greater than 0.25 inch) the metal vapor and/or plasma within the keyhole cannot escape efficiently, causing a cloud 110 of the metal vapor and/or plasma to linger at the top of the keyhole 104 and/or above the workpiece 100. The cloud 110 can cause the laser energy of the laser beam 102 to scatter, as indicated by arrows 102'. Scattering the laser beam 102 can cause the material on either side of the weld seam 108 to melt, and can leave the weld seam 108 porous-rather than allowing for increased weld depth from the higher power of the laser beam 102.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

FIG. 4 is a flow diagram of an LBW process or method configured in accordance with embodiments of the present technology.

DETAILED DESCRIPTION

Figure 1:
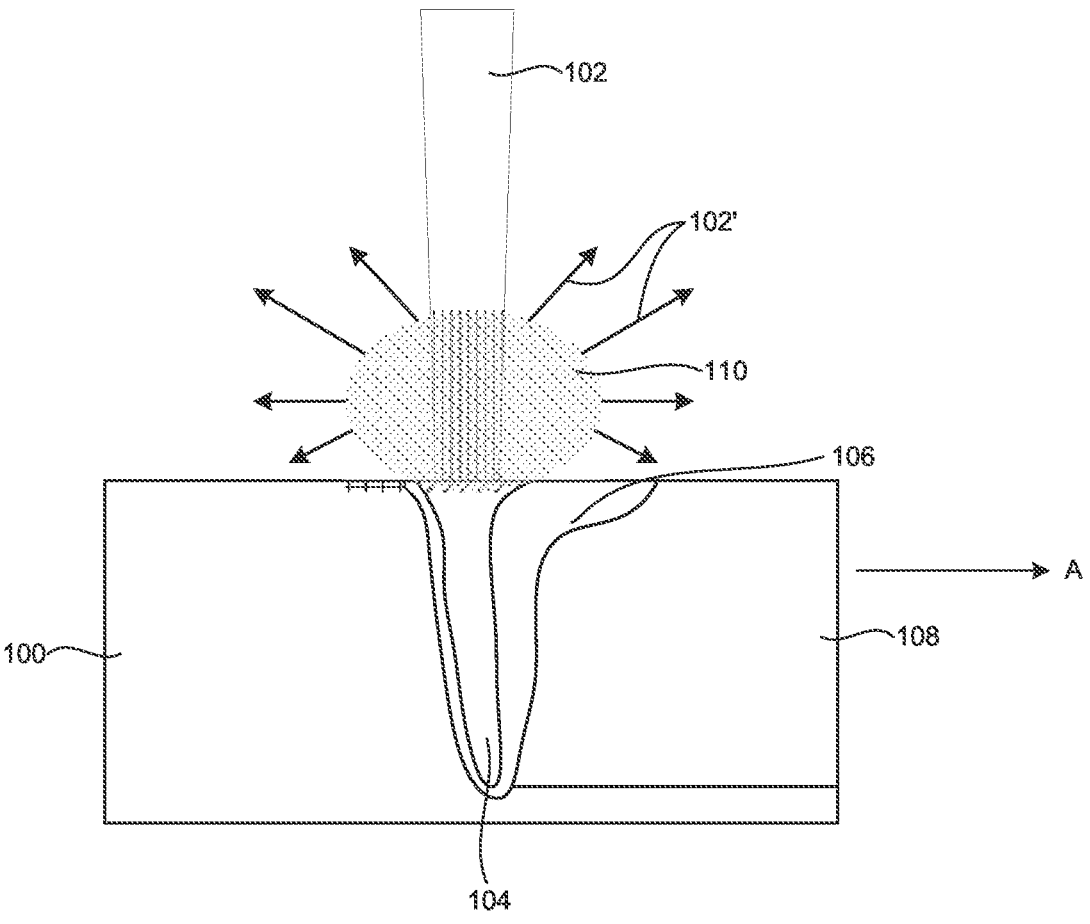
FIG. 1 is a side cross-sectional view of a metal workpiece during a laser beam welding LBW process in accordance with the prior art.

Aspects of the present disclosure are directed generally to systems for laser beam welding (LBW) in a vacuum and for controlling laser beam welding processes, such as for use in manufacturing aerospace parts. In several of the embodiments described below, an LBW system includes an optical head positioned within a vacuum chamber. The optical head can be configured to direct a laser beam toward a part positioned within the vacuum chamber to melt and fuse the part. In some embodiments, a part support is configured to receive and secure the part within the vacuum chamber.

In one aspect of the present the technology, the part support and the optical head are configured to move relative to one another. For example, the part support and/or the optical head can be rotatable about and/or translatable along one or more axes within the vacuum chamber. This arrangement can permit the optical head to be positioned at almost any desired orientation and distance relative to the part within the vacuum chamber. In particular, in some embodiments the optical head can be positioned such that the part is at a fixed focal distance relative to processing optics of the optical head. Accordingly, by dynamically varying the position of the optical head and/or the part, the distance between the optical head and the part can be maintained at a predetermined focal distance to precisely concentrate the laser beam on the part, and thus provide a high-quality weld having any of a variety of suitable, specified patterns along the part. Moreover, the dynamic arrangement of the optical head and the part support can facilitate welding parts that have dimensions that are approximately equal to the dimensions of the vacuum chamber—generally maximizing the volumetric efficiency of the LBW system.

In another aspect of the present technology, it is expected that LBW at reduced ambient pressure will reduce or eliminate the likelihood for the laser beam to scatter, thereby reducing weld defects and improving the weldability of materials typically considered difficult to weld via LBW processes. Moreover, it is expected that such increased weld efficiency can be achieved at low or medium vacuum pressures—and thus does not require that the vacuum chamber of the LBW system be evacuated to a hard vacuum, such as is required by conventional electron beam welding (EBW) systems. For example, in some embodiments only a single vacuum pump (e.g., a roughing pump) can be used to maintain a rough vacuum (e.g., a low or medium vacuum) in the vacuum chamber during operation. Accordingly, the LBW systems of the present technology can be cheaper to operate and simpler to manufacture and maintain as compared to conventional EBW systems.

Certain details are set forth in the following description and in FIGS. 1-6 to provide a thorough understanding of various embodiments of the present technology. In other instances, well-known structures, materials, operations, and/ or systems often associated with LBW, additive manufacturing, laser systems, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. For example, while many of the embodiments are described below in the context of LBW, the laser systems of the present technology can be configured for additive manufacturing processes alternatively to or in addition to LBW.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the spirit or scope of the present technology. In addition, those of ordinary skill in the art will appreciate that further embodiments of the present technology can be practiced without several of the details described below.

Figure 2:
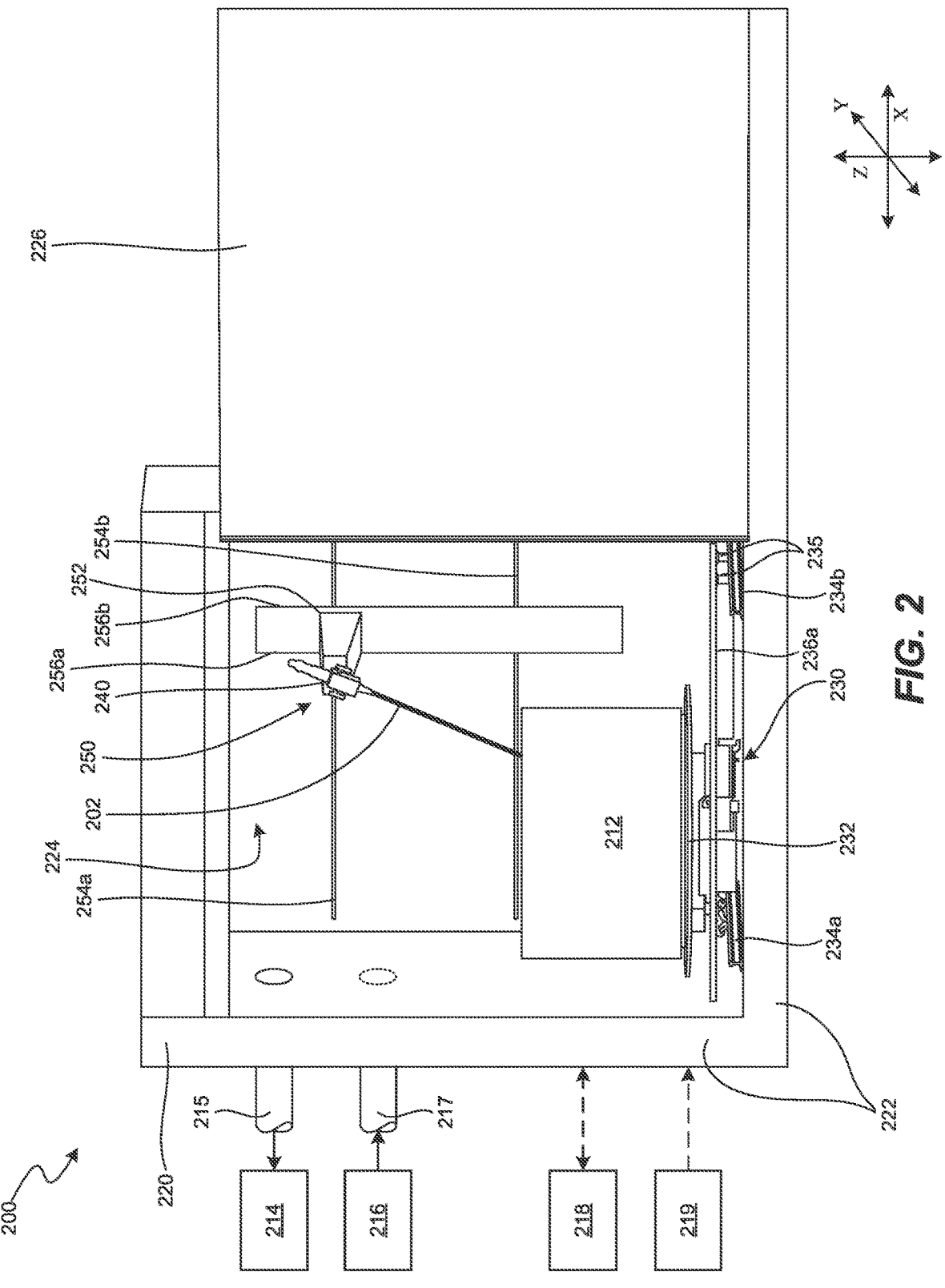
FIG. 2 is a partially-schematic, front isometric view of an LBW system configured in accordance with embodiments of the present technology.

FIG. 2 is a partially-schematic, front isometric view of a laser beam welding (LBW) system 200 configured in accordance with embodiments of the present technology. As shown in FIG. 2, the LBW system 200 includes a chamber 220 in which a part support structure 230 and an optical head 240 are positioned. The part support structure 230 can include a platform 232 configured to releasably secure one or more parts 212 ("parts 212"), such as aerospace part(s) to be repaired and/or welded together. The platform 232 can be movable (e.g., translatable) along at least one axis (e.g., along at least one of the axes indicated by reference numerals X, Y, and Z) to vary the position of the parts 212 within the chamber 220. The optical head 240 can be configured to direct one or more laser beams 202 toward the parts 212 to heat, melt, and/or fuse at least a portion of (e.g., a predetermined pattern on) the parts 212. In some embodiments, the optical head 240 is movable (e.g., translatable) along at least one axis, and/or rotatable to vary the position (e.g., the location and/or orientation) of the optical head 240 relative to the parts 212. A vacuum source 214 is operably coupled to the chamber 220 and configured to at least partially evacuate the chamber 220 to reduce the pressure within the chamber 220 (e.g., as compared to the surrounding environment) during operation of the LBW system 200. As described in greater detail below, it is expected that welding the parts 212 under reduced pressure-even under a low or medium vacuum-will reduce or eliminate the laser beam scattering, thereby reducing weld defects and improving the weldability of materials typically considered difficult to weld via LBW processes.

The chamber 220 can include chamber walls 222 that define an interior chamber volume 224. In some embodiments, the interior chamber volume 224 can be between about 1-1000 cubic meters or larger. In some embodiments, the LBW system 200 can include a door 226 that is movable between (i) an open position (shown in FIG. 2) that allows access to the chamber 220, and (ii) a closed position that encloses the interior chamber volume 224. The door 226 can be slidable along a track, pivotable about a hinge, or otherwise movable between the open and closed positions. The door 226 can be moved to the open position to permit the parts 212 to be loaded/unloaded from within the chamber 220, and can be moved to the closed position during operation of the LBW system 200. In some embodiments, the LBW system 200 can include one or more sealing members (not shown) that seal an interface between the door 226 and the chamber 220 when the door is in the closed position to, for example, enable a vacuum to be maintained within the chamber 220.

The vacuum source 214 (shown schematically in FIG. 2) can be fluidly coupled to the interior chamber volume 224 via a first port 215 formed in one of the chamber walls 222. In other embodiments, multiple vacuum sources can be coupled to the interior chamber volume 224 via one or more ports formed in the chamber walls 222. The vacuum source 214 can include a pump or other component configured to reduce the pressure within the chamber 220 during operation of the LBW system 200. In some embodiments, the vacuum source 214 is a roughing pump configured to provide a low vacuum or a medium vacuum within the chamber 220 (e.g., a vacuum of between about 10-100,000 mTorr). In some embodiments, the pressure within the chamber 220 can be selected based on one or more material characteristics of the parts 212. For example, the pressure can be selected based on the vapor pressure of a material of the parts 212.

In some embodiments, the LBW system 200 can optionally include a gas source 216 (shown schematically in FIG. 2) coupled to the interior chamber volume 224 via a second port 217 formed in one of the chamber walls 222. The gas source 216 can be configured to supply a gas to the chamber 220 that is selected to chemically interact with the parts 212 during operation of the LBW system 200. For example, the gas can be selected to change a surface chemistry of the parts 212 and/or to chemically alter physical properties of the parts 212 when in a molten state. More specifically, for example, the surface tension of the parts 212 can be modified by the addition of active gasses to, for example, reduce a tendency to form porosity and/or improve strength through gaseous additions. Alternatively or additionally, the gas can be selected to add reducing or oxidizing agents. In one aspect of the present technology, because the vacuum source 214 need only provide a low or medium vacuum within the chamber 220, the gas source 216 can supply a gas to the chamber 220 even while the vacuum source 214 operates to reduce the pressure in the chamber 220.

The parts 212 can be releasably secured to the platform 232 via one or more clamps, robotic arms, spindles, and/or other securement devices (not shown). In some embodiments, the part support structure 230 can include one or more tracks mounted within the chamber 220, and the platform 232 can be movably (e.g., slidably) coupled to the tracks to enable movement of the platform 232 within the chamber 220. For example, in the illustrated embodiment the part support structure 230 includes (i) a first pair of tracks 234 (identified individually as a first track 234a and a second track 234b) mounted to a lower one of the chamber walls 222 and aligned along the Y-axis, and (ii) a second pair of tracks 236 (identified individually as a first track 236a and a second track 236b; only the first track 236a is visible in FIG. 2) movably coupled to the first pair of tracks 234 and aligned along the X-axis. In some embodiments, the second pair of tracks 236 are mounted to the first pair of tracks 234 via one or more wheels 235 to enable the first pair of tracks 236 to smoothly move back and forth along the Y-axis. The platform 232 can be movably coupled to the second pair of tracks 236 (e.g., via one or more wheels, sliders, and/or other movement devices; not shown) to enable the platform 232 to smoothly move back and forth along the X-axis. In this manner, the position of the platform 232 within the chamber 220 can be dynamically varied along both the X-axis and the Y-axis to position the part 212 at any desired location within the chamber 220.

The second pair of tracks 236 and the platform 232 can be driven via one or more actuators (e.g., linear actuators; not shown) operably coupled thereto. The actuators that can be positioned within the chamber 220 (e.g., within the platform 232) and/or external to the chamber 232. In other embodiments, the tracks 234, 236 and/or the platform 232 can be movably coupled together via other suitable mechanisms, and/or the number of tracks 234, 236 can be varied. For example, the LBW system 200 can include a greater number of tracks (e.g., more than two parallel tracks 234, 236) to support parts 212 having a greater weight. In general, the platform 232 can be moved within the chamber 220 via any suitable means. For example, the tracks 234, 236 can be replaced or supplemented with a robotic, CNC-controlled, or otherwise automated track-less vehicle that can move to any suitable position along the X- and Y-axes within the chamber 220.

In some embodiments, the first pair of tracks 234 can extend outside of the chamber 220 past the door 226 such that the platform 232 can be positioned partially or entirely outside of the chamber 220. Such an arrangement can facilitate loading the parts 212 onto the platform 232 especially, for example, when the parts 212 are large and/or heavy enough to require machinery (e.g., cranes, trucks, etc.) for loading/unloading the parts 212 onto/off the platform 232. In some embodiments, the parts 212 can be loaded/unloaded onto the platform 232 via one or more automated processes. For example, machinery such as robotic platforms, cranes, etc., can be configured to removably position the parts 212 on the platform 232 and/or to deliver the parts 212 to the platform 232.

In some embodiments, the part support structure 230 can include one or more components for varying the vertical position (e.g., along the Z-axis) of the parts 212 within the chamber 220. For example, the part support structure 230 can include one or more actuators configured to move the platform 232 vertically along the Z-axis. Moreover, in some embodiments the platform 232 can be rotatable to vary the orientation of the parts 212 within the chamber 220.

As shown in FIG. 2, the optical head 240 can be supported within the chamber 220 by a head support structure 250. A laser source 219 (shown schematically in FIG. 2) is positioned outside of the chamber 220 and configured to produce/generate the laser beam 202. In the illustrated embodiment, the laser source 219 is optically coupled to the optical head 240 via one or more optical fibers (not shown) that penetrate one or more of the chamber walls 222. In other embodiments, the laser source 219 can be positioned within the chamber 220—for example, integrated into the optical head 240.

The head support structure 250 can include some components generally similar to the part support structure 230 described in detail above. For example, in the illustrated embodiment the head support structure 250 includes (i) a first pair of tracks 254 (identified individually as a first track 254a and a second track 254b) mounted to a rear one of the chamber walls 222 and aligned along the X-axis, and (ii) a second pair of tracks 256 (identified individually as a first track 256a and a second track 256b) movably (e.g., slidably) coupled to the first pair of tracks 254 and aligned along the Z-axis. The head support structure 250 can further include a support 252 movably coupled to the second pair of tracks 236. In the illustrated embodiment, the optical head 240 is mounted to the support 252. Accordingly, the position of the optical head 240 within the chamber 220 can be dynamically varied along (i) the X-axis via movement of the second pair of tracks 256 along the first pair of tracks 254, and (ii) the Z-axis via movement of the support 252 along the second pair of tracks 256. In some embodiments, the optical head 240 can be rotatably mounted to the support 252 to vary the orientation of the head 240 within the chamber 220.

Figure 3:
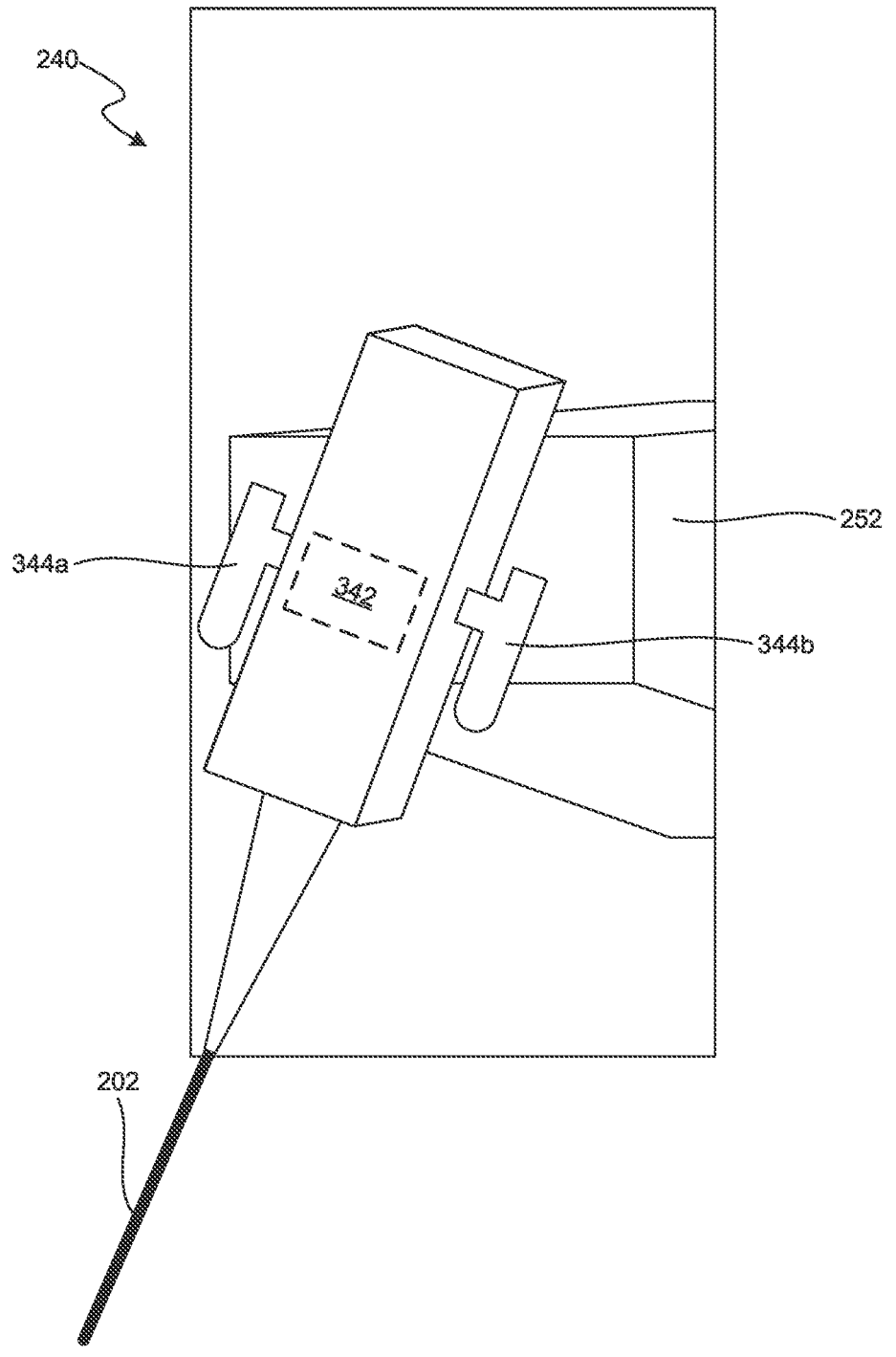
FIG. 3 is an enlarged isometric view of an optical head of the LBW system of FIG. 2 configured in accordance with embodiments of the present technology.

FIG. 3 is an enlarged perspective view of the optical head 240 configured in accordance with embodiments of the present technology. In the illustrated embodiment, the optical head 240 includes processing optics 342 (shown schematically) for focusing and/or concentrating the laser beam 202. The processing optics 342 can include one or more passive or active optical components such as, for example, mirrors, lenses, amplifiers, etc. In one aspect of the present technology, the optical head 240 is specifically configured for use in a vacuum. For example, the optical head 240 can include electronics compatible with a vacuum and/or a venting system.

In some embodiments, the optical head 240 can further include one or more cameras 344 (identified individually as a first camera 344a and a second camera 344b) configured to capture image data of the parts 212 (FIG. 2). In the illustrated embodiment, the cameras 344 are positioned off an optical axis of the laser beam 202 while, in other embodiments, the optical axes of one or both of the cameras 344 can be coaxially aligned with the optical axis of the laser beam 202. For example, the processing optics 342 can include one or more mirrors, lenses, etc., for coaxially aligning the optical axes of the cameras 344 and the laser beam 202.

In some embodiments, the first camera 344a is configured to capture image data for aligning the processing optics 342 and the optical head 240 with the parts 212 (FIG. 2) before and during operation of the LBW system 200. For example, the image data from the first camera 344a can be used to verify the path of the laser beam 202 across the parts 212. In some embodiments, the second camera 344b is configured to capture image data of one or more characteristics or parameters of an LBW welding process carried out by the LBW system 200. For example, referring to FIGS. 1 and 3 together, such parameters can include (i) a shape, size, depth, etc., of the keyhole 104, (ii) a shape, size, vibration frequency, motion characteristic, fluidity characteristic, etc., of the molten metal pool 106, and/or (iii) a shape, size, etc., of the weld seam 108 (FIG. 1). In some embodiments, the captured data corresponding to these parameters can be used as feedback for controlling the power of the laser beam 202, a rate of movement of the optical head 240, a rate of movement of the platform 232, and/or another operating characteristic or parameter of the LBW system 200.

Referring to FIGS. 2 and 3 together, the cameras 344 can be positioned within the chamber 220 without being mounted to or incorporated into the optical head 240. For example, in some embodiments one or both of the cameras 344 can be fixedly mounted to one of the chamber walls 222, mounted to a separate support (e.g., a movable support structure), or positioned outside of the chamber 220 behind a window or other transparent barrier. In some embodiments, the optical head 240 can alternatively or additionally include a laser imaging system having an optical axis coaxially aligned with the optical axis of the laser beam 202. In some embodiments, such a laser imaging system can be used to accurately measure the depth of the keyhole 104 (FIG. 1).

Referring again to FIG. 2, the LBW system 200 can include a controller 218 (shown schematically in FIG. 2; e.g., a computer-numeric-controlled (CNC) controller) programmed with instructions for directing the operations and motions carried out by the vacuum source 214, the gas source 216, the part support structure 230, the optical head 240, the head support structure 250, and/or other components of the LBW system 200. Accordingly, the controller 218 can include a processor, memory, input/output devices, and a computer-readable medium containing instructions for performing some or all of the tasks described herein. In some embodiments, the controller 218 is configured to receive feedback information from, for example, the cameras 344 (FIG. 3) in real time or near real time. In some embodiments, the controller 218 is configured to modify/direct operations and motions of the various components of the LBW system 200 based at least in part on the received feedback information.

In one aspect of the present technology, the LBW system 200 is configured to operate with the chamber 220 at low/vacuum pressure. As noted above, it is expected that welding the parts 212 at pressures less than ambient pressure (e.g., less than one atmosphere) will reduce or even eliminate the effects of laser beam scattering caused by process effluent—and reduce the vapor pressure of the liquid metal, encouraging vaporization which has positive effects on keyhole stability-thereby reducing weld defects and improving the weldability of materials. In particular, with reference to FIGS. 1 and 2, it is expected that the reduced pressure in the chamber 220 will increase the stability of the keyhole 104 (e.g., formed in the parts 212 by the laser beam 202) compared to when the chamber 220 is at atmospheric pressure. For example, the greater pressure differential between the keyhole 104 and the chamber 220 can cause vaporized metal in the keyhole 104 to evacuate the keyhole 104 more quickly, thereby reducing the size/density of the cloud 110 of vaporized metal. Less scattering of the laser beam 112 can both increase the quality of the weld seam 108 (e.g., by reducing the porosity of the weld seam 108) and increase the depth of the weld seam 108—thus increasing the overall strength of the weld seam 108. Moreover, referring to FIGS. 1-3 together, more rapidly evacuating the keyhole 104 can provide a clearer view of the keyhole 104, molten metal pool 106, and/or the weld seam 108—thereby enabling the cameras 344 and/or a laser imaging system to capture higher-resolution data for feedback into the LBW process.

Moreover, in contrast to conventional EBW systems, the LBW system 200 does not require that a hard vacuum be formed in the chamber 220. This aspect of the present technology can significantly reduce the system cost and complexity, and increase the durability and flexibility of the LBW system 200 compared to EBW systems. For example, in some embodiments only a single pump is needed to provide a sufficient vacuum within the chamber 220 and, accordingly, the LBW system 200 can easily be scaled for larger chamber volumes to receive larger parts without significantly increasing the cost and complexity of the required vacuum source. Additionally, minor leaks in the chamber 220 will not necessarily shut down operation of the LBW system 200 because a low vacuum can be sufficient to carry out operations. That is, the chamber 220 need not be airtight. Using a low or medium vacuum also enables active gases to be pumped into the chamber 220 (e.g., from the gas source 216), which can enhance the efficacy of the LBW operation. Furthermore, unlike with conventional EBW systems, in an LBW system, contact between the laser beam 202 and the parts 212 does not generate significant and potentially dangerous X-radiation.

In another aspect of the present technology, both the parts 212 and the optical head 240 are movably positioned within the chamber 220. This arrangement allows the optical head 240 to be positioned at almost any desired orientation and distance relative to the parts 212 (limited only by the dimensions of the chamber 220). In particular, the optical head 240 can be positioned such that the parts 212 are at a fixed focal distance relative to the processing optics 342 (FIG. 3) of the optical head 240. Accordingly, by dynamically moving the optical head 240 and/or the parts 212 during an LBW operation, the distance between the optical head 240 and the parts 212 can be maintained at the predetermined focal distance of the optical head 240 to precisely concentrate the laser beam 202 on the parts 212, so as to efficiently heat the parts 212 and produce a high-quality weld. Moreover, the dynamic arrangement of the optical head 240 and the platform 232 allows for parts that have dimensions that are approximately equal to the dimensions of the chamber 220 to be welded within the chamber 220.

In contrast, the few existing LBW systems incorporating a vacuum chamber include optical laser components that are fixed outside of the vacuum chamber. Such LBW systems are limited in that they can only produce welds having a length substantially shorter than the dimensions of the vacuum chamber, as parts can only be shifted a relatively small distance within the vacuum chamber. For example, a conventional LBW system including a vacuum chamber having dimensions of 6 feet by 6 feet and having a fixed optical component aligned with a center thereof would only have space to produce a 3 foot weld, since parts in the vacuum chamber could only be moved within the chamber by half the dimensions of the chamber (i.e., 3 feet). Moreover, such conventional LBW systems are further limited in that it can be difficult or impossible to position a part—especially a non-planar or contoured part—at the focal length of the laser optics since the optical components are fixed outside the vacuum chamber. As set forth above, the LBW system 200 of the present technology is configured to overcome these limitations of conventional LBW systems by movably positioning the optical components (e.g., the optical head 240) within the vacuum chamber 220 in which the parts 212 are positioned. This increases the volumetric efficiency of the LBW system 200 and allows for welding of more complicated (e.g., more contoured) parts.

FIG. 4 is a flow diagram of an LBW process or method 460 configured in accordance with embodiments of the present technology. In some embodiments, the LBW system 200 of FIGS. 2 and 3 can be used to implement the method 460 illustrated in FIG. 4. Accordingly, for the sake of illustration, some features of the method 460 will be described in the context of the embodiments shown in FIGS. 2 and 3.

The method 460 starts at block 461 by positioning the parts 212 within the chamber 220 of the LBW system 200. For example, in some embodiments the platform 232 can first be moved outside of the chamber 220 with the door 226 in the open position. The parts 212 can then be secured to the platform 232 and the platform 232 can be moved inside of the chamber 220 with the parts 212 secured thereto. Finally, the door 226 can be moved to the closed position.

At block 462, the method 460 includes receiving an LBW task or job for the parts 212. The LBW task can include a set of computer-readable instructions configured to be executed by the controller 218 to cause the LBW system 200 to carry out a specified welding, repair, and/or other action on the parts 212. For example, the LBW task can include instructions executable by the controller 218 to control a power of the laser beam 202, a rate and/or direction of movement of the optical head 240, a rate and/or direction of movement of the platform 232, a power level of the vacuum source 214, a gas supply rate from the gas source 216, vacuum pressure, and/or another operating parameter of the LBW system 200. In some embodiments, the LBW task is a welding task including instructions to weld/fuse two or more parts 212 together in a specific configuration. In some embodiments, the LBW task can additionally or alternatively be a repair task, including instructions for repairing a damaged portion of a single part 212.

At block 463, the method 460 includes moving the optical head 240 and or the parts 212 to an initial position based on the received LBW task. For example, the controller 218 can execute the received LBW task instructions to move the platform 232, the support 252, and/or the optical head 240 to position the optical head 240 at a predetermined distance from the parts 212 (e.g., corresponding to a focal length of the processing optics 342).

At block 464, the method 460 includes generating a vacuum in the chamber 220 using the vacuum source 214. In some embodiments, the received LBW task can include instructions to set the pressure within the chamber 220 to a predetermined level. The predetermined pressure can be based on, for example, one or more material characteristics (e.g., a vapor pressure) of the parts 212.

At block 465, the method 460 includes executing the received LBW task. For example, the controller 218 can control the platform 232, the support 252, the optical head 240, the laser source 219, and/or other components of the LBW system 200 to move the parts 212 and/or the laser beam 202 relative to each other to heat and fuse the parts 212 (e.g., a selected pattern or path along the parts 212). The relative motion between the optical head 240 and the parts 212 can be achieved through any combination of movement of the parts 212 (e.g., via movement of the platform 232) and/or movement of the optical head 240 (e.g., via movement of the support 252 and/or rotation of the optical head 240). As described above, the optical head 240 can be maintained at the focal length of the processing optics 342 throughout execution of the LBW task-no matter the shape of the parts 212 or the selected weld pattern.

At block 466, the method 460 includes receiving feedback regarding the execution of the LBW task. For example, the controller 218 can be communicatively coupled to the cameras 344 and configured to receive image data therefrom. As described above, the image data can be processed to determine (i) a shape, size, depth, etc., of a keyhole formed in the parts 212, (ii) a shape, size, vibration frequency, motion characteristic, fluidity characteristic, etc., of a molten metal pool near the keyhole, (iii) a shape, size, etc., of a weld seam formed along the parts, and/or other parameters of the LBW welding task carried out by the LBW system 200. In some embodiments, the controller 218 can receive and process the image data from the cameras 344 in real time or near real time.

At block 467, the method 460 includes updating the LBW task based on the received feedback. For example, the controller 218 can be configured to control/change the power of the laser beam 202, the rate and/or direction of movement of the optical head 240, the rate and/or direction of movement of the platform 232, the power level of the vacuum source 214, the gas supply rate of the gas source 216, etc., based on the feedback received from the cameras 344. For example, if the controller 218 determines that the size of the molten metal pool near the keyhole is too small (e.g., below a predetermined level), the controller 218 can change the power level of the laser beam 202 and/or slow the rate of movement of the laser beam 202 across the parts 212 to transfer more energy per unit area to the parts 212 and increase the size of the molten metal pool.

At block 468, the method 460 includes determining whether the LBW task has been completed. If not, the method 460 returns to block 466 and includes continuing to receive feedback regarding the execution of the LBW task before proceeding to block 467 and updating the LBW task based on the received feedback. In some embodiments, the controller 218 receives and processes feedback regarding the execution of the LBW task (block 466) and subsequently updates the LBW task (block 467) in real time or near real time.

Although described in the context of LBW, in other embodiments the systems and methods of the present technology can be adapted for use in additive manufacturing processes. For example, referring to FIG. 2, the part support structure 230 could be adapted to include a build platform that carries additive material, generally in the form of multiple, sequentially deposited additive material layers, each of which is initially in a powder form (e.g., a powder bed). The optical head 240 can be configured to direct the laser beam 202 toward the build platform to locally heat selected portions of each sequentially deposited additive material layer to melt and consolidate the powder, forming a stack of hardened material layers that together form a finished part.

Figure 5:
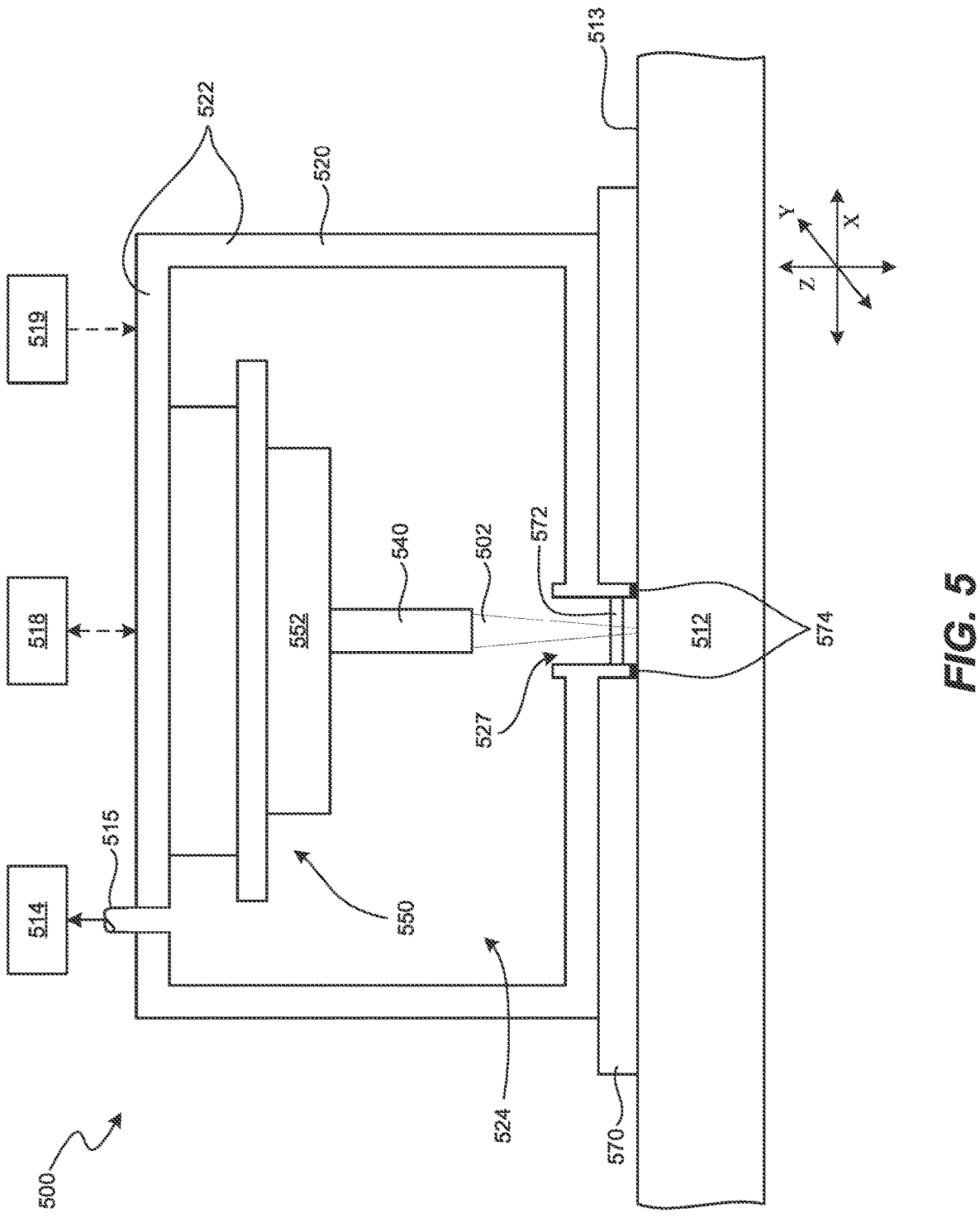
FIG. 5 is a partially schematic cross-sectional side view of an LBW system configured in accordance with embodiments of the present technology.

FIG. 5 is a partially schematic cross-sectional side view of an LBW system 500 configured in accordance with embodiments of the present technology. The LBW system 500 can include some features generally similar to the LBW system 200 described in detail above with reference to FIGS. 2-4. For example, the LBW system 500 can include a chamber 520 having chamber walls 522 defining an interior chamber volume 524. An optical head 540 is supported within the chamber 520 by a head support structure 550 and is configured to direct one or more laser beams 502 toward one or more parts 512 ("parts 512") to heat, melt, and/or fuse the parts 512. A laser source 519 (shown schematically in FIG. 5) is optically coupled to the optical head 540 and configured to produce/generate the laser beam 502. A vacuum source 514 is operably coupled to the chamber 520 and configured to at least partially evacuate the chamber 520 to reduce the pressure within the chamber 520 during operation of the LBW system 500.

However, in the illustrated embodiment shown in FIG. 5, the chamber 520 is configured to move (e.g., "crawl") across a surface 513 of the parts 512, such as a planar or generally planar surface of an aerospace part, a pipeline, etc. More particularly, the chamber 520 can be carried by and/or coupled to a mobile platform 570 configured to move the chamber 520 across the surface 513 of the parts 512. Thus, the mobile platform 570 can have an interface positioned to move across the surface 513 of the parts 512. In some embodiments, the mobile platform 570 is a robotic or otherwise automated track-less vehicle that can move to any suitable position along the surface 513 of the parts 512.

As shown in FIG. 5, the chamber 520 includes an opening 527 formed in a lower one of the chamber walls 522. The optical head 540 can be aligned with/over the opening 527 and is configured to direct the laser beam 502 through the opening 527 toward the parts 512. In some embodiments, the head support structure 550 is configured to move the optical head 540 along at least one axis (e.g., along at least one of the axes indicated by reference numerals X, Y, and Z) to vary the position of the optical head 540 relative to the opening 527 and the parts 512. For example, the optical head 540 can be mounted to a support 552 which is slidably mounted to one or more tracks (not shown) to enable back-and-forth movement of the optical head 540 along one more of the axes X, Y, and Z. In some embodiments, the optical head 540 can be rotatably mounted to the support 552 to vary the orientation of the head 540 within the chamber 520. In other embodiments, the optical head 540 is fixedly mounted within the chamber 520 such that relative motion between the laser beam 502 and the parts 512 is provided solely by movement of the mobile platform 570.

The vacuum source 514 (shown schematically in FIG. 2) can be coupled to the interior chamber volume 524 via a port 515 formed in one of the chamber walls 522 (e.g., an upper one of the chamber walls 522). In some embodiments, the vacuum source 514 can be mounted to and carried by the chamber 520. As described in detail above, the vacuum source 514 can include a roughing pump or other vacuum source configured to reduce the pressure in the chamber 520 to, for example, a low or medium vacuum. In other embodiments, the vacuum source 514 can be configured to reduce the pressure in the chamber 520 to a high vacuum.

In the illustrated embodiment, the LBW system 500 includes an optical window 572 configured to substantially maintain a seal between the chamber 520 and the environment surrounding the chamber 520. The optical window 572 spans across the opening 527 and is configured to inhibit or even prevent the movement of the gases through the opening 527 while permitting the laser beam 502 to pass therethrough. In some embodiments, the optical window 572 is a transparent plate that is designed/selected to increase (e.g., maximize) the transmission of the laser beam 502 therethrough (e.g., to maximize the transmission of light having the same wavelength as that of the laser beam 502). In some embodiments, the LBW system 500 can additionally or alternatively include a sealing portion 574 (e.g., a sliding vacuum seal) that is positioned at the interface between the chamber 520 and the parts 512 and configured to seal the chamber 520 from the surrounding environment. In some embodiments, the mobile platform 570 can seal the interface between the parts 512 and the chamber 520.

The LBW system 500 can further include a controller 518 (shown schematically in FIG. 5; e.g., a CNC controller) programmed with instructions for directing the operations and motions carried out by the vacuum source 514, the laser source 519, the mobile platform 570, the optical head 540, the head support structure 550, and/or other components of the LBW system 500. In some embodiments, the controller 518 is configured to receive feedback information from cameras and/or other sensors positioned within the chamber 520—for example, cameras mounted to the optical head 540 as described in detail above with reference to FIG. 3. The controller 518 can be configured to modify/direct operations and motions of the various components of the LBW system 500 based at least in part on the received feedback information. Moreover, in some embodiments the controller 518 is configured to receive position information from one or more sensors in the mobile platform 570 and/or in another portion of the LBW system 500 for determining a position/location of the LBW system 500 on the surface 513 of the parts 512.

In one aspect of the present technology, the mobile platform 570 allows the chamber 520 to be moved over/across the surface 513 of the parts 512 to provide laser-in-vacuum welding of the parts 512. In some embodiments, the LBW system 500 is configured to be deployed in the field such as, for example, at the location of an aircraft on a launch pad or tarmac, at a remote pipeline site, at a ship or bridge building or repair site, etc. Accordingly, the LBW system 500 can provide the aforementioned benefits of an LBW system including an optical head movably positioned within a vacuum chamber—while also being configured for deployment in many environments.

Figure 6:
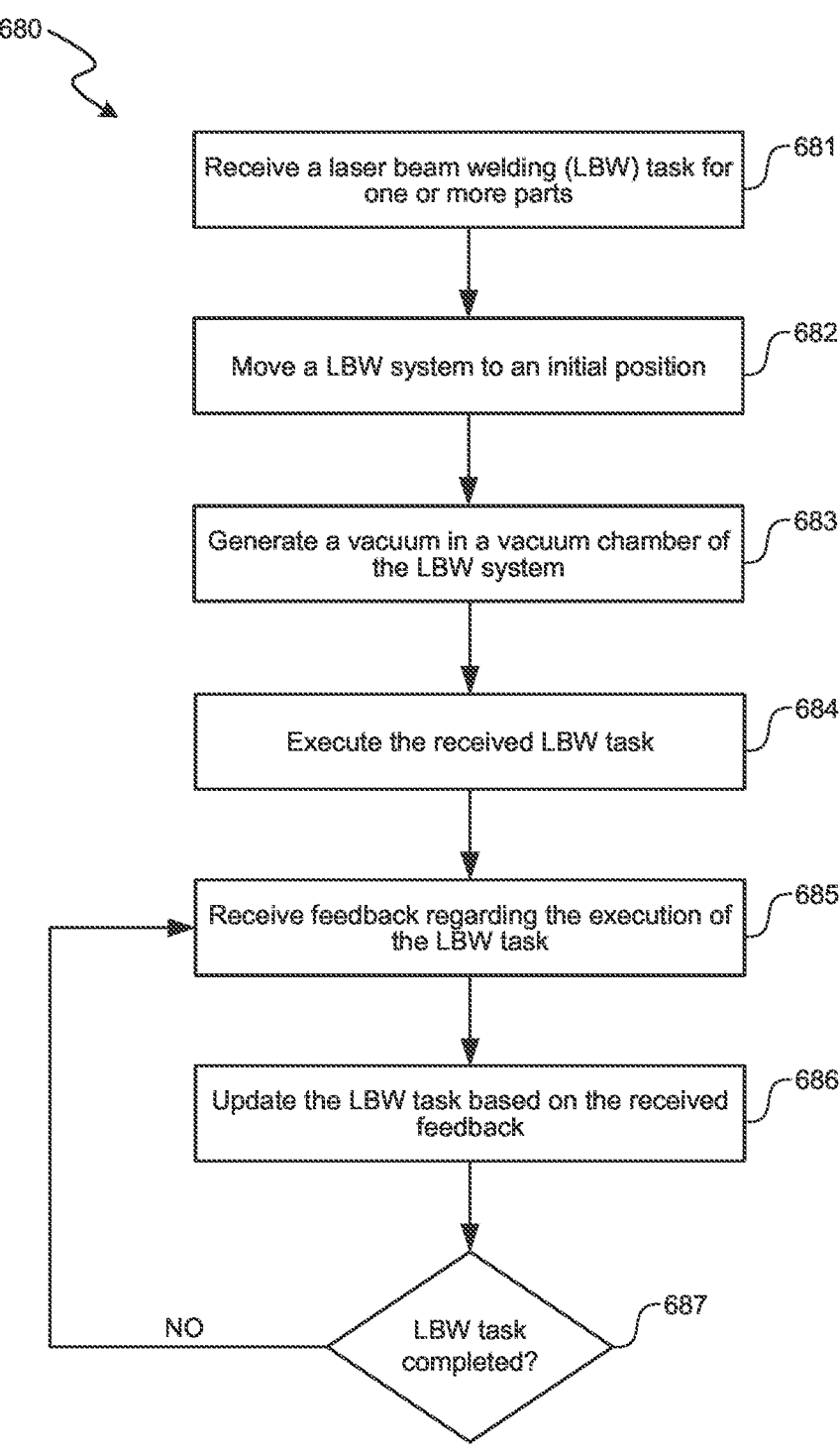
FIG. 6 is a flow diagram of an LBW process or method configured in accordance with embodiments of the present technology.

FIG. 6 is a flow diagram of an LBW process or method 680 configured in accordance with an embodiment of the present technology. In some embodiments, the LBW system 500 of FIG. 5 can be used to implement the method 680 illustrated in FIG. 6. Accordingly, for the sake of illustration, some features of the method 680 will be described in the context of the embodiments shown in FIG. 5. Some aspects of the method 680 can be generally similar or the same as those of the method 460 described in detail above with reference to FIG. 4.

The method 680 starts at block 681 by receiving an LBW task or job for the parts 512. The LBW task can include a set of computer-readable instructions configured to be executed by the controller 518 to cause the LBW system 200 to carry out a specified welding, repair, and/or other action on the parts 512. For example, the LBW task can include instructions executable by the controller 518 to control a power of the laser beam 502, a rate and/or direction of movement of the optical head 540, a rate and/or direction of movement of the mobile platform 570, a power level of the vacuum source 514, and/or another operating parameter of the LBW system 500.

At block 682, the method 680 includes moving the LBW system to an initial position. For example, the controller 518 can execute the received LBW task instructions to (i) move the mobile platform 570 to a specified starting position on the surface 513 of the parts 512, and/or (ii) actuate the head support 550 and/or the optical head 540 to position the optical head 540 at a predetermined distance and/or orientation relative to the opening 527 and the parts 512.

At block 683, the method 680 includes generating a vacuum in the chamber 520 using the vacuum source 514.

At block 684, the method 680 includes executing the received LBW task. For example, the controller 618 can control the mobile platform 570 to move the chamber 520 and the laser beam 502 across the surface 513 of the parts 512. At the same time, in some embodiments the controller 618 can control the optical head 540 and/or the head support structure 550 to vary a position and/or orientation of the optical head 540 within the chamber 520. In this manner the laser beam 502 can be moved/traversed across the parts 512 to heat and fuse a selected pattern on the parts 512.

At block 685, the method 680 can optionally include receiving feedback regarding the execution of the LBW task such as, for example, a shape, size, depth, etc., of a keyhole, a molten metal pool, and/or a weld seam formed in the parts 512, and/or a position of the mobile platform 570 along the surface 513 of the parts 512.

At block 686, the method 680 includes updating the LBW task based on the received feedback. For example, the controller 218 can be configured to control/change the power of the laser beam 502, the rate and/or direction of movement of the optical head 540, the rate and/or direction of movement of the mobile platform 570, the power level of the vacuum source 514, etc., based on the received feedback.

At block 687, the method 680 determines whether the LBW task has been completed. If not, the method 680 returns to block 685 and continues to receive feedback regarding the execution of the LBW task before proceeding to block 686 and updating the LBW task based on the received feedback. In some embodiments, the controller 518 receives and processes feedback regarding the execution of the LBW task (block 685) and subsequently updates the LBW task (block 686) in real time or near real time.

The above detailed description of embodiments of the technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. The following examples provide further representative embodiments of the present technology.

The invention claimed is:

1. A laser beam welding (LBW) system, comprising:
a vacuum chamber carried by a mobile platform; and
an optical head movably and rotatably positioned within the vacuum chamber, wherein the optical head is positioned to direct a laser beam toward a part positioned within the vacuum chamber to heat and melt a portion of the part.

2. The LBW system of claim 1, further comprising a part support positioned to releasably secure the part within the vacuum chamber, wherein the part support is movable within the vacuum chamber.

3. The LBW system of claim 2 wherein the part support is movable back and forth along at least a first axis and a second axis.

4. The LBW system of claim 1, further comprising a roughing pump fluidly coupled to the vacuum chamber, wherein the roughing pump is configured to reduce the pressure in the vacuum chamber.

5. The LBW system of claim 4 wherein the roughing pump is configured to reduce the pressure in the vacuum chamber to between 10-100,000 mTorr.

6. The LBW system of claim 1 wherein the vacuum chamber is not airtight.

7. The LBW system of claim 1, further comprising a camera positioned within the vacuum chamber and positioned to capture image data of the heated and melted portion of the part.

8. The LBW system of claim 7, further comprising a controller operably coupled to the camera, wherein the controller includes a computer-readable medium storing instructions that, when executed by one or more processors of the controller, cause the controller to perform operations including:
receiving the image data from the camera; and
determining one or more characteristics of the heated and melted portion of the part based at least in part on the image data.

9. The LBW system of claim 8 wherein the one or more characteristics include at least one of (a) a shape, size, and/or depth of a keyhole formed in the heated and melted portion of the part, (b) a shape, size, vibration frequency, motion characteristic, and/or fluidity characteristic of a molten metal pool formed in the heated and melted portion of the part, and (c) a shape and/or size of a weld seam formed across the heated and melted portion of the part.

10. The LBW system of claim 8 wherein the controller is operably coupled to the optical head, and wherein the instructions, when executed by the one or more processors of the controller, further cause the controller to perform operations including modifying a parameter of the laser beam based at least in part on the determined one or more characteristics, and wherein the parameter includes at least one of (a) a power of the laser beam and (b) a rate of movement of the laser beam relative to the part.

11. A laser beam welding (LBW) system, comprising:

a mobile platform having a first interface positioned to move across a surface of a part;

a vacuum chamber carried by the mobile platform, a second interface of the mobile platform protruding from an outer surface of the vacuum chamber; and an optical head movably positioned within the vacuum chamber, wherein the optical head is positioned to direct a laser beam toward the surface of the part, through an opening in the first interface and the second interface, to heat and melt a portion of the part.

12. The LBW system of claim 11 wherein the optical head is rotatably positioned within the vacuum chamber.

13. The LBW system of claim 11, further comprising a roughing pump fluidly coupled to the vacuum chamber to reduce the pressure in the vacuum chamber.

14. The LBW system of claim 11 wherein the vacuum chamber is not airtight.

15. The LBW system of claim 11 wherein the second interface includes a platform-part seal.

16. The LBW system of claim 11, further comprising:

a camera positioned within the vacuum chamber and positioned to capture image data of the heated and melted portion of the part; and a controller operably coupled to the camera, wherein the controller includes a computer-readable medium storing instructions that, when executed by one or more processors of the controller, cause the controller to perform operations including:

receiving the image data from the camera; and determining one or more characteristics of the heated and melted portion of the part based at least in part on the image data.

17. The LBW system of claim 16 wherein the controller is operably coupled to the optical head, wherein the instructions, when executed by the one or more processors of the controller, further cause the controller to perform operations including modifying a parameter of the laser beam based at least in part on the determined one or more characteristics.

18. The LBW system of claim 16 wherein the controller is operably coupled to the mobile platform, wherein the instructions, when executed by the one or more processors of the controller, further cause the controller to perform operations including modifying a parameter of the mobile platform based at least in part on the determined one or more characteristics, and wherein the parameter includes at least one of (a) a speed of the mobile platform and (b) a direction of movement of the mobile platform.

* * * * *